United States Patent
Lee et al.

(10) Patent No.: US 9,894,004 B2
(45) Date of Patent: Feb. 13, 2018

(54) SWITCH DEVICE, INFORMATION PROCESSING SYSTEM, AND METHOD FOR CONTROLLING SWITCH DEVICE

(71) Applicant: FUJITSU LIMITED, Kawasaki-shi, Kanagawa (JP)

(72) Inventors: Chunghan Lee, Kawasaki (JP); Yukihiro Nakagawa, Kawasaki (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/629,890

(22) Filed: Feb. 24, 2015

(65) Prior Publication Data

US 2015/0281106 A1    Oct. 1, 2015

(30) Foreign Application Priority Data

Mar. 25, 2014   (JP) ................................. 2014-062657

(51) Int. Cl.
| | |
|---|---|
| H04L 12/26 | (2006.01) |
| H04L 12/801 | (2013.01) |
| H04L 12/863 | (2013.01) |
| H04L 12/851 | (2013.01) |

(Continued)

(52) U.S. Cl.
CPC .............. *H04L 47/33* (2013.01); *H04L 45/38* (2013.01); *H04L 47/2441* (2013.01); *H04L 47/2483* (2013.01); *H04L 47/6255* (2013.01); *H04L 45/54* (2013.01)

(58) Field of Classification Search
USPC ......... 370/229, 230, 230.1, 235, 235.1, 236, 370/241, 246, 252, 412, 413
See application file for complete search history.

(56) References Cited

U.S. PATENT DOCUMENTS 8,717,891 B2 *   5/2014   Nishimura ............... H04L 47/22
                                                          370/232
2002/0136163 A1 *   9/2002   Kawakami .............. H04L 47/26
                                                          370/229

(Continued)

FOREIGN PATENT DOCUMENTS

| JP | 2009-177658 | 8/2009 |
|---|---|---|
| JP | 2013-191931 | 9/2013 |

*Primary Examiner* — Kwang B Yao
*Assistant Examiner* — Nguyen Ngo
(74) *Attorney, Agent, or Firm* — Staas & Halsey LLP

(57) ABSTRACT

A switch device includes a retaining unit, a switching processing unit, an identifying unit, and a rewriting unit. The retaining unit retains a flow table that maps each flow to a flag indicating whether the amount of transmitted data is equal to or more than a predetermined threshold. The switching processing unit stores a data packet received by a receiving buffer in one of a plurality of output queues provided for respective transmission ports based on the destination. The identifying unit identifies data packets included in a flow in which the amount of data is equal to or more than a predetermined threshold, from the data packets received by the receiving buffer. The rewriting unit refers to congestion notification information included in each of the identified data packets, and rewrites information indicating congestion to information indicating no congestion when the congestion notification information includes the information indicating congestion.

4 Claims, 16 Drawing Sheets

(51) Int. Cl.
*H04L 12/721* (2013.01)
*H04L 12/741* (2013.01)

(56) References Cited

U.S. PATENT DOCUMENTS

| | | | |
|---|---|---|---|
| 2003/0043742 A1* | 3/2003 | De Maria | H04L 47/10 370/230 |
| 2006/0203721 A1* | 9/2006 | Hsieh | H04L 12/4633 370/229 |
| 2006/0251109 A1* | 11/2006 | Muller | H04L 45/745 370/463 |
| 2012/0195201 A1* | 8/2012 | Ishikawa | H04L 41/0896 370/235.1 |
| 2013/0235729 A1 | 9/2013 | Mutoh et al. | |
| 2014/0016461 A1* | 1/2014 | Ishikawa | H04L 47/17 370/230 |
| 2014/0126393 A1* | 5/2014 | Kirshnan | H04L 43/026 370/252 |
| 2015/0071072 A1* | 3/2015 | Ratzin | H04L 47/11 370/235 |
| 2015/0172193 A1* | 6/2015 | Sinha | H04L 47/12 370/230 |

* cited by examiner

| Flow_ID | Dst_MAC | Src_MAC | ... | Flow_Count | E-flag |
|---|---|---|---|---|---|
| F001 | *** | *** | ... | 0.15 | 0 |
| F002 | *** | *** | ... | 2048 | 1 |
| F003 | *** | *** | ... | 0.3 | 0 |
| ⋮ | ⋮ | ⋮ | ⋮ | ⋮ | ⋮ |

SWITCH DEVICE, INFORMATION PROCESSING SYSTEM, AND METHOD FOR CONTROLLING SWITCH DEVICE

CROSS-REFERENCE TO RELATED APPLICATION

This application is based upon and claims the benefit of priority of the prior Japanese Patent Application No. 2014-062657, filed on Mar. 25, 2014, the entire contents of which are incorporated herein by reference.

FIELD

The embodiments discussed herein are related to a switch device, an information processing system, and a method for controlling a switch device.

BACKGROUND

A switch device that switches data packets flowing through a communication network sometimes becomes congested when data packets concentrate. In a known technology for resolving congestion in a switch device, a communication device serving as a transmitter of data packets is caused to reduce the current congestion window size to a predetermined size when congestion occurs. It is also known that the flows in the Internet traffic have a data packet distribution in which a large number of mouse flows, each containing a small number of data packets, are intermixed with a small number of elephant flows, each containing a large number of data packets. Related art examples are disclosed in Japanese Laid-open Patent Publication No. 2013-191931 and Japanese Laid-open Patent Publication No. 2009-177658.

When the size of the congestion window is reduced when congestion occurs, data packets will be transmitted at a lower transmission rate. If the data packets are transmitted at a lower transmission rate, it will take a longer time for the data transmission to be completed for an elephant flow with a larger amount of data, compared with a mouse flow with a smaller amount of data. The throughput of the data transmitted by an elephant flow is therefore affected more, when the data packets included in a mouse flow and those included in an elephant flow are controlled consistently by reducing the congestion window size. Furthermore, when a smaller congestion window size is used, even a mouse flow with a small amount of data is transmitted at a lower transmission rate, and the resultant throughput might be reduced. In this manner, congestion control using a congestion window has been sometimes difficult to handle data packets efficiently.

SUMMARY

According to an aspect of an embodiment, a switch device that receives a data packet transmitted by a transmitter device and transmits the data packet to a receiver device includes a retaining unit, a receiving unit, a storing unit, an identifying unit, a rewriting unit, and a transmitting unit. The retaining unit retains a flow table that maps each flow including a series of data packets transmitted from the transmitter device to the receiver device to a flag indicating whether an amount of data transmitted by the flow is equal to or more than a first threshold. The receiving unit receives the data packets transmitted by the transmitter device. The storing unit stores the data packets received by the receiving unit in one of a plurality of output queues provided for respective transmission ports based on a destination of the data packets. The identifying unit identifies data packets included in a flow mapped with a flag indicating that the amount of transmitted data is equal to or more than the first threshold from the data packets received by the receiving unit, by referring to the flow table. The rewriting unit refers to congestion notification information notifying whether congestion has occurred, the congestion notification information being included in each of the data packets identified by the identifying unit, and rewrites the information indicating that congestion has occurred to information indicating that no congestion has occurred when information indicating that congestion has occurred is included in the congestion notification information. The transmitting unit transmits the data packets in the output queue.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments described below are not intended to limit the scope of the technologies according to the application in any way. These embodiments may also be combined as appropriate, within the scope in which the processes are not contradictory.

[a] First Embodiment

Figure 1:
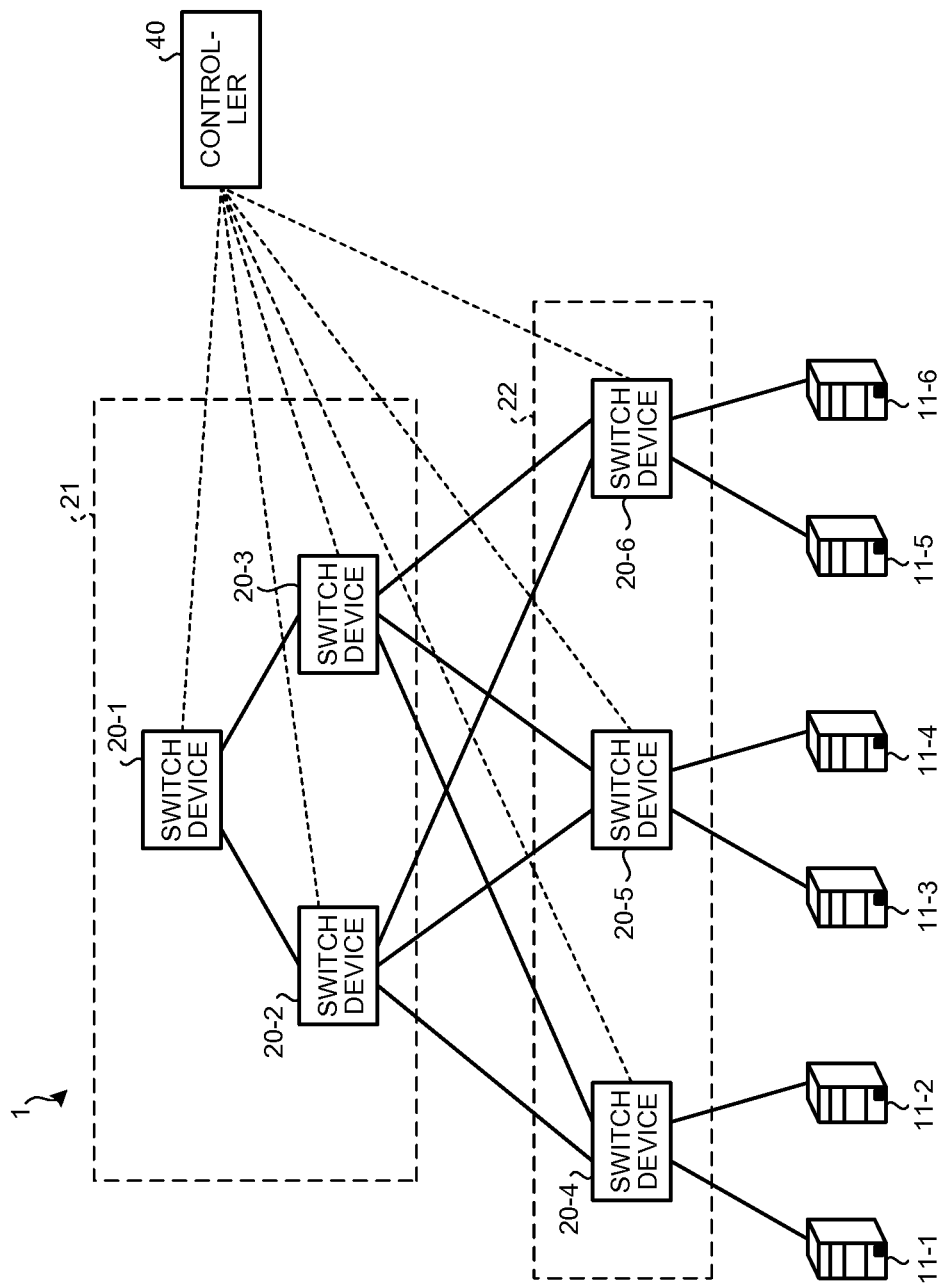
FIG. 1 is a schematic illustrating an example of an information processing system according to a first embodiment.

FIG. 1 is a schematic illustrating an example of an information processing system 1 according to a first embodiment. The information processing system 1 includes a plurality of switch devices 20-1 to 20-6, a plurality of communication devices 11-1 to 11-6, and a controller 40. The information processing system 1 is deployed in a data center, for example. The communication devices 11-1 to 11-6 are servers, for example. Hereinafter, the switch devices 20-1 to 20-6 are generally referred to as switch devices 20 when each of the switch devices 20-1 to 20-6 is not distinguished from one another. The communication devices 11-1 to 11-6 are generally referred to as communication devices 11 when each of communication devices 11-1 to 11-6 is not distinguished from one another.

The information processing system 1 includes, for example, an upper-level switch group 21 consisting of a plurality of spine switches, for example, and a lower-level switch group 22 consisting of a plurality of leaf switches, for example. The upper-level switch group 21 includes a plurality of switch devices 20-1 to 20-3, for example, and the lower-level switch group 22 includes a plurality of switch devices 20-4 to 20-6, for example. Each of the switch devices 20-4 to 20-6 is connected to two or more of the switch devices 20-1 to 20-3, and each of the switch devices 20-4 to 20-6 is connected to the communication devices 11. The switch devices 20 form a fat tree topology, for example.

Each of the switch devices 20 has a function for learning addresses to allow a mapping relation to be established between the source media access control (MAC) address specified in a received data packet and an external port at which the data packet is received, and for retaining the mapping relation in a forwarding database (FDB), for example. When a data packet is received, each of the corresponding switch devices 20 refers to the FDB, and transmits the data packet from the external port mapped to the destination MAC address specified in the received data packet.

The controller 40 is connected to each of the switch devices 20, and controls each of the switch devices 20. In this embodiment, the controller 40 is a software-defined network (SDN) controller, for example, and each of the switch devices 20 is an SDN-compatible switch, for example.

The controller 40 transmits a flow table to the switch devices 20. The flow table describes information such as information for identifying each flow including a series of data packets to be transmitted from a source communication device 11 to a destination communication device 11. Each of the switch devices 20 retains the flow table received from the controller 40, and identifies the flow including a received data packet with reference to the retained flow table.

Block Diagram of Switch Device 20

Figure 2:
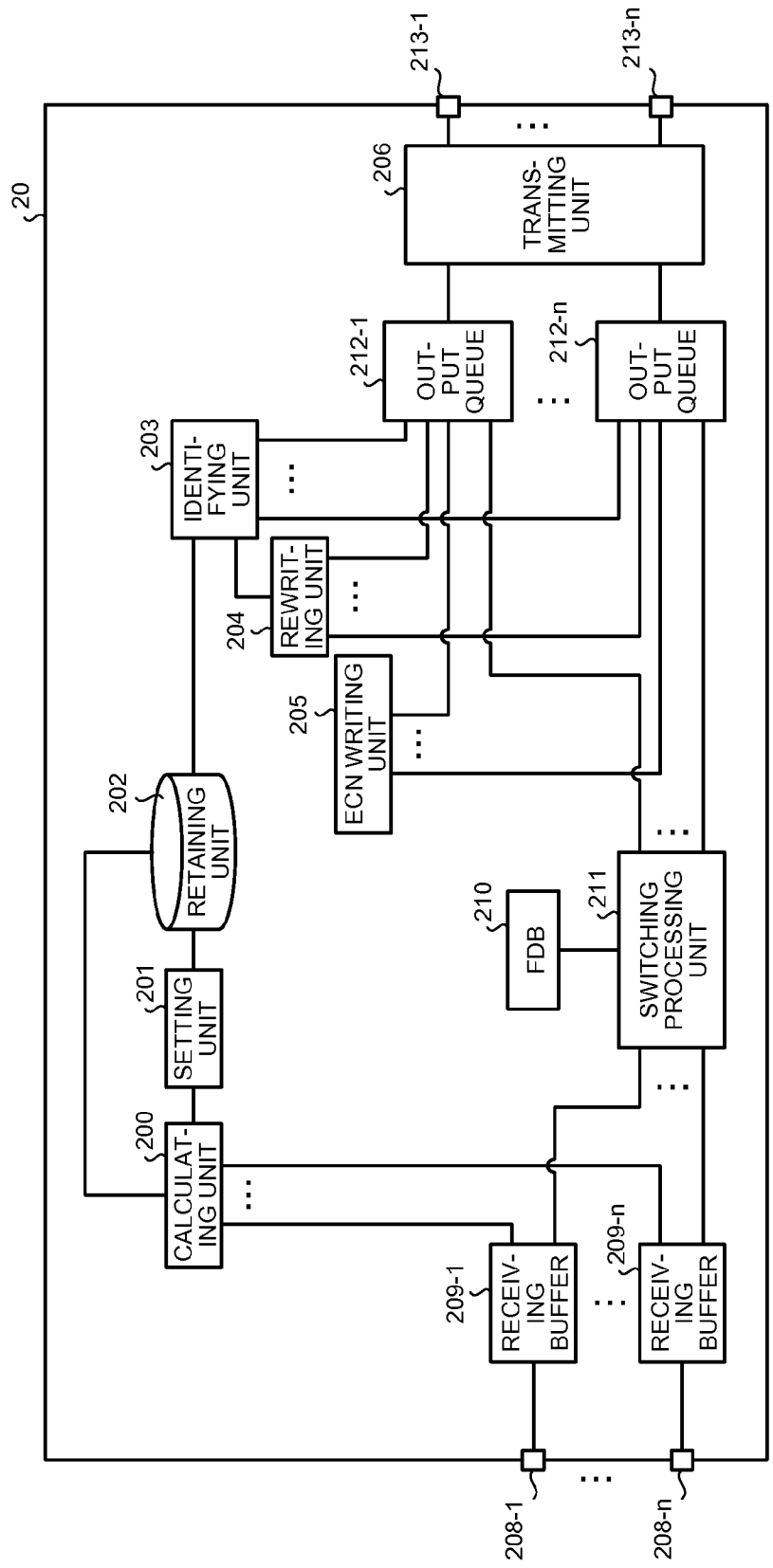
FIG. 2 is a block diagram illustrating an example of a switch device according to the first embodiment.

FIG. 2 is a block diagram illustrating an example of a switch device 20 according to the first embodiment. The switch device 20 includes a calculating unit 200, a setting unit 201, a retaining unit 202, an identifying unit 203, a rewriting unit 204, an explicit congestion notification (ECN) writing unit 205, and a transmitting unit 206. The switch device 20 also includes a plurality of receiving ports 208-1 to 208-$n$, a plurality of receiving buffers 209-1 to 209-$n$, an FDB 210, a switching processing unit 211, a plurality of output queues 212-1 to 212-$n$, and a plurality of transmission ports 213-1 to 213-$n$.

Hereinafter, the receiving ports 208-1 to 208-$n$ are generally referred to as receiving ports 208 when each of the receiving ports 208-1 to 208-$n$ is not distinguished from one another, and the receiving buffers 209-1 to 209-$n$ are generally referred to as receiving buffers 209 when each of the receiving buffers 209-1 to 209-$n$ is not distinguished from one another. The output queues 212-1 to 212-$n$ are generally referred to as output queues 212 when each of the output queues 212-1 to 212-$n$ is not distinguished from one another, and the transmission ports 213-1 to 213-$n$ are generally referred to as transmission ports 213 when each of the transmission ports 213-1 to 213-$n$ is not distinguished from one another.

Figures 3, 4:
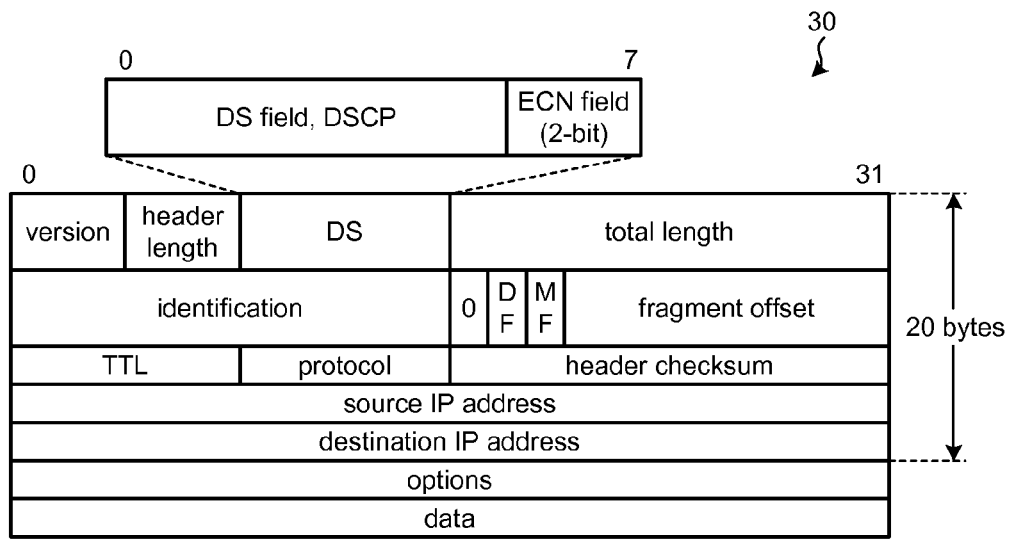
FIG. 3 is a schematic illustrating an example of a flow table.
FIG. 4 is a schematic for explaining the bit position of an ECN flag.

The retaining unit 202 retains a flow table 2020 illustrated in FIG. 3, for example. FIG. 3 is a schematic illustrating an example of the flow table 2020. The flow table 2020 stores therein, for example, match fields 2022, a Flow_Count 2023, and an E-flag 2024, in a manner mapped to a Flow_ID 2021 that identifies a flow, as illustrated in FIG. 3.

The match fields 2022 store therein information for identifying a series of data packets included in the corresponding flow, e.g., the destination MAC address (Dst_MAC) and the source MAC address (Src_MAC) of a data packet included in the corresponding flow. The Flow_Count 2023 stores therein information indicating a cumulative amount of data in the data packets included in the corresponding flow.

The E-flag 2024 stores therein "1" when the cumulative amount of data in the data packets included in the flow is equal to or more than a predetermined threshold, e.g., 1 megabyte, and stores therein "0" when the cumulative amount of data in the data packets included in the flow is less than the predetermined threshold. Hereinafter, when the cumulative amount of data to be forwarded for is equal to or more than the predetermined threshold, e.g., 1 megabyte, the flow is referred to as an elephant flow, and when the cumulative amount of data to be forwarded is less than predetermined threshold, the a flow is referred to as a mouse flow.

The receiving buffers 209 are provided for the respective receiving ports 208, and receive data packets via the respective receiving ports 208. Each of the receiving buffers 209 is an example of a receiving unit. The output queues 212 are provided for the respective transmission ports 213, and retain the data packets received from the switching processing unit 211 in the order the data packets are received. The transmitting unit 206 transmits the data packets retained in the output queues 212 in the order the data packets are retained in the output queues 212, via the respective transmission ports 213 corresponding to the output queues 212. Each of the receiving ports 208 is connected to an external port to which corresponding one of the transmission ports 213 is connected.

When the receiving buffers 209 receive a data packet, the switching processing unit 211 is caused to map and to register the source MAC address specified in the data packet to the information of the external port corresponding to that receiving buffer 209 in the FDB 210. If the destination MAC address specified in the data packet is registered in the FDB 210, the switching processing unit 211 stores the data packet in the output queue 212 corresponding to the external port mapped to the destination MAC address. If the destination MAC address specified in the data packet is not registered in the FDB 210, the switching processing unit 211 stores copies of the data packet in all of the respective output queues 212, except for the output queue 212 corresponding to the transmission port 213 connected to the external port from which the data packet is received. The switching processing unit 211 is an example of a storing unit.

When the receiving buffers 209 receive a data packet, the calculating unit 200 is caused to identify a Flow_ID of the flow including the data packet, based on the match fields in the flow table 2020 and the header information of the data packet. The calculating unit 200 then identifies the Flow_Count that is mapped to the identified Flow_ID from the flow table 2020.

The ECN writing unit 205 monitors the amount of data in each of the output queues 212, and determines whether the amount of data in any one of the output queues 212 is equal to or more than a predetermined threshold. The predetermined threshold is, for example, 65 packets, when the transmission rate of the transmission port 213 is 10 gigabits per second, for example. If the ECN writing unit 205 determines that the amount of data in any one of the output queues 212 becomes equal to or more than the predetermined threshold, when the switching processing unit 211 stores the data packet in the output queue 212 in which the amount of data has become equal to or more than the predetermined threshold, or when the transmitting unit 206 takes out the data packet from the output queue 212 in which the amount of data has become equal to or more than the predetermined threshold, the ECN writing unit 205 writes "11" to the ECN flag in the internet protocol (IP) header of the data packet.

FIG. 4 is a schematic for explaining the bit position of the ECN flag. The ECN flag is assigned to the two least significant bits of the Differentiated Services (DS) field of the header in the IP data packet 30. In the ECN flag, "00" represents that congestion detection is not supported, "10" or "01" represents that congestion can be detected but congestion is not currently detected, and "11" represents that congestion can be detected and congestion is currently detected. The ECN flag is an example of congestion notification information notifying the presence or absence of congestion.

When received is a data packet having a header with an ECN flag written with "11", the receiver communication device 11 returns an acknowledgement (ACK) packet having a TCP header with an ECN-Echo (ECE) flag written with "1".

Figure 5:
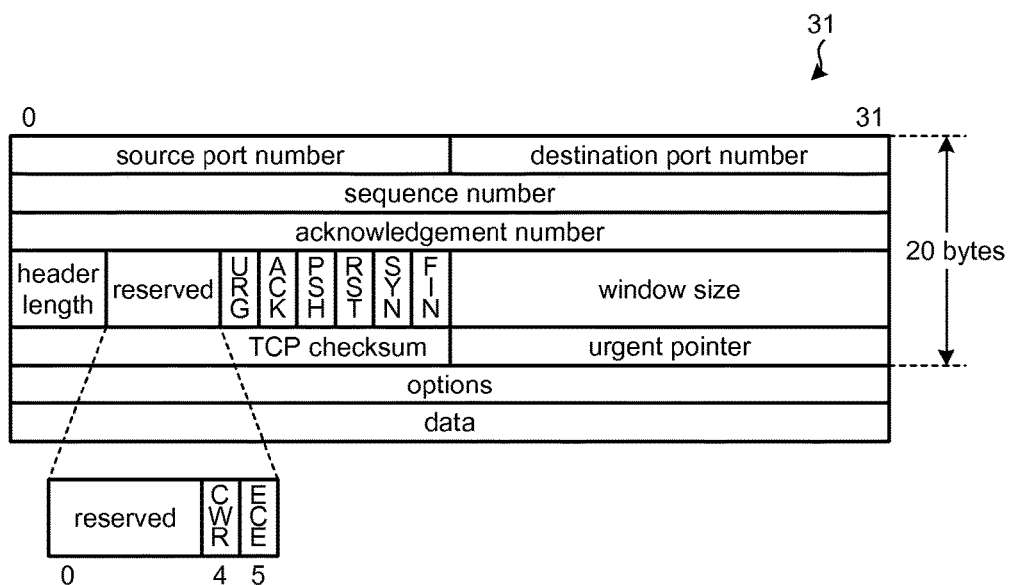
FIG. 5 is a schematic for explaining the bit position of an ECE flag.

FIG. 5 is a schematic for explaining the bit position of the ECE flag. The ECE flag is assigned to one bit of the header (e.g., the least significant bit of the 6-bit Reserved field) of the TCP packet 31. "0" set to the ECE flag represents no congestion, and "1" represents congestion. To the second bit next to the least significant bit of the Reserved field, for example, Congestion Window Reduced (CWR) flag is assigned. "0" set to the CWR flag represents that congestion window is not reduced, and "1" represents that the congestion window is reduced.

The identifying unit 203 refers to the data packets in each of the output queues 212, and identifies the data packets included in a flow mapped with an E-flag indicating that the amount of data to be forwarded is equal to or more than the predetermined threshold, by referring to the flow table 2020.

For example, the identifying unit 203 refers to the header of each of the data packets in the output queues 212 and the flow table 2020, and identifies the Flow_ID of the flow including the data packet. The identifying unit 203 then determines whether the E-flag mapped to the identified Flow_ID is "1", that is, whether the flow corresponding to the identified Flow_ID is an elephant flow. If the E-flag is "1", the identifying unit 203 sends information for identifying the data packet included in the flow with an E-flag of "1" to the rewriting unit 204.

When the information for identifying the data packet is received from the identifying unit 203, the rewriting unit 204 refers to each of the output queues 212, and identifies the data packets identified with the received information. The rewriting unit 204 then determines whether the ECN flag in the IP header is "11" indicating congestion, for each of the identified data packets.

If the ECN flag in the IP header is "11", the rewriting unit 204 rewrites the ECN flag to "10", for example, indicating no congestion. If the ECN flag in the IP header is not "11", the rewriting unit 204 does not rewrite the ECN flag. In this manner, the ECN flag in a data packet included in the elephant flow is rewritten to "10" by the rewriting unit 204, even when the ECN flag originally written by the ECN writing unit 205 is "11". By contrast, the data packet included in the mouse flow in which the ECN flag is written with "11" by the ECN writing unit 205 is not rewritten by the rewriting unit 204 and remains to specify "11".

In the embodiment, the rewriting unit 204 rewrites the ECN flag after the ECN writing unit 205 writes the ECN flag. The transmitting unit 206 transmits the data packets in the output queues 212 after the rewriting unit 204 rewrites the ECN flag.

Block Diagram of Communication Device 11

Figure 6:
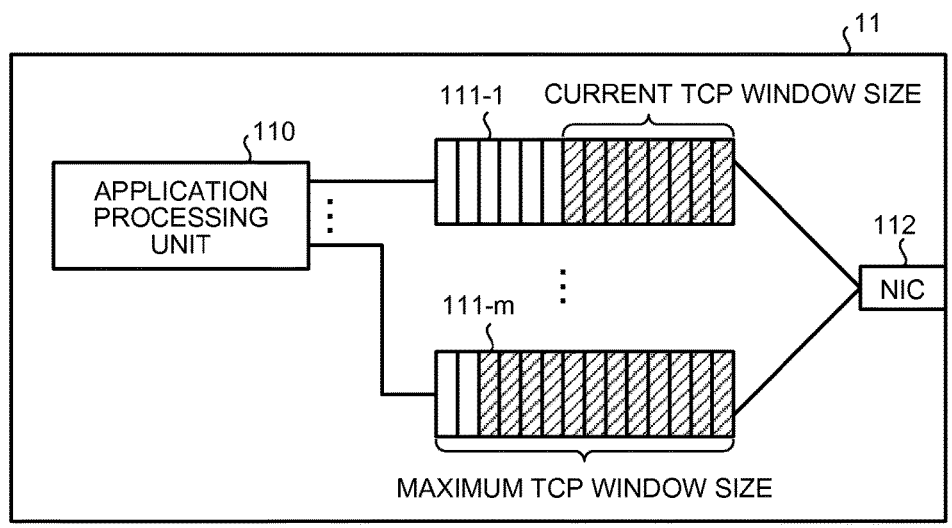
FIG. 6 is a block diagram illustrating an example of a communication device according to the first embodiment.

FIG. 6 is a block diagram illustrating an example of the communication device 11 according to the first embodiment. The communication device 11 includes an application processing unit 110, a plurality of TCP socket buffers 111-1 to 111-m, and a network interface card (NIC) 112. The TCP socket buffers 111-1 to 111-m are provided for respective sockets, for example.

When an ACK packet written with an ECE flag of "1" is received as a response to a data packet having transmitted, the application processing unit 110 reduces the current TCP window size that is the size of the congestion window to a half, for example, in the corresponding TCP socket buffer 111. The application processing unit 110 writes "1" to the CWR flag in the TCP header of the data packet stored in the TCP socket buffer 111 in which the TCP window size is reduced.

Operation of Switch Device 20

Figure 7:
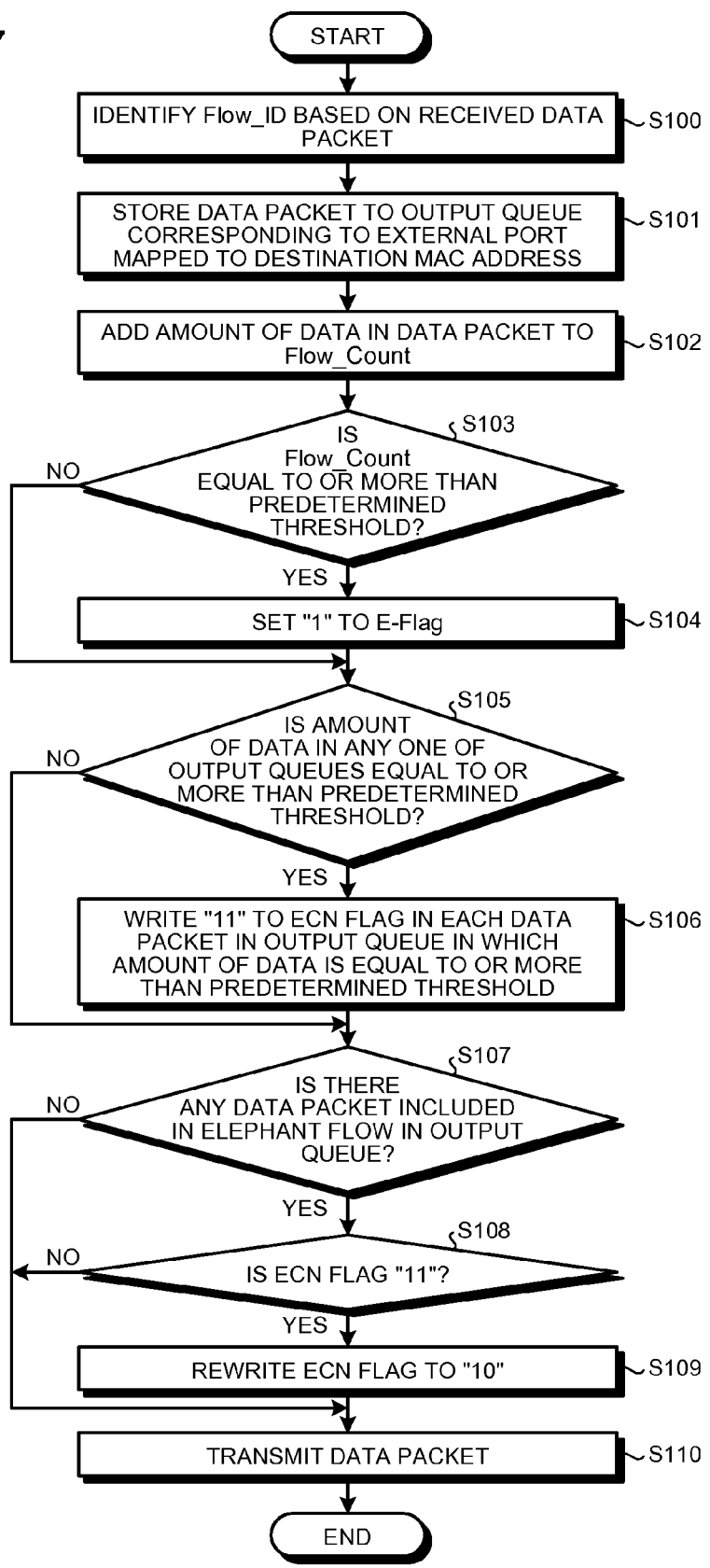
FIG. 7 is a flowchart illustrating an example of an operation of the switch device according to the first embodiment.

FIG. 7 is a flowchart illustrating an example of an operation of the switch device 20 according to the first embodiment. The switch device 20 starts the operation illustrated in this flowchart when a data packet is received.

To begin with, the calculating unit 200 identifies the Flow_ID of the flow including the data packet by referring to the match fields in the retaining unit 202 based on the header information of the data packet received by the receiving buffer 209 (Step S100). The switching processing unit 211 then refers to the FDB 210, and stores the data packet in the output queue 212 corresponding to the external port mapped to the destination MAC address specified in the data packet (Step S101).

The calculating unit 200 then identifies the Flow_Count mapped to the identified Flow_ID from the flow table 2020. The calculating unit 200 then updates the Flow_Count by adding the amount of data in the data packet received by the receiving buffer 209 to the identified Flow_Count (Step S102). The setting unit 201 then determines whether the Flow_Count after the addition is equal to or more than the predetermined threshold (Step S103).

If the Flow_Count is less than the predetermined threshold (No at Step S103), the ECN writing unit 205 executes the process at Step S105. If the Flow_Count is equal to or more than the predetermined threshold (Yes at Step S103), the setting unit 201 sets the E-flag mapped to the Flow_Count to "1" (Step S104).

The ECN writing unit 205 then determines whether the amount of data in any one of the output queues 212 is equal to or more than the predetermined threshold by referring to the amount of data in each of the output queues 212 (Step S105). If the amounts of data in all of the output queues 212 are less than the predetermined threshold (No at Step S105), the identifying unit 203 executes the process at Step S107.

If the amount of data in any one of the output queues 212 is equal to or more than the predetermined threshold (Yes at Step S105), the ECN writing unit 205 writes "11" to the ECN flag in each of the data packets in the output queue 212 in which the amount of data becomes equal to or more than the predetermined threshold (Step S106).

The identifying unit 203 then determines whether there is any data packet included in an elephant flow in the output queue 212, by referring to the data packets in each of the output queues 212 and the flow table 2020 (Step S107). If there is no data packet included in an elephant flow in the output queues 212 (No at Step S107), the rewriting unit 204 does not rewrite the ECN flag in the data packet. The transmitting unit 206 then transmits the data packets retained in the output queues 212 from the transmission ports 213 corresponding to the respective output queues 212, in the order in which the data packets are retained in the output queues 212 (Step S110), and the switch device 20 ends the operation illustrated in this flowchart.

If there is some data packet included in an elephant flow in the output queues 212 (Yes at Step S107), the identifying unit 203 sends information for identifying the data packet included in the elephant flow to the rewriting unit 204. The rewriting unit 204 then identifies the data packet included in the elephant flow identified with the information received from the identifying unit 203, among the data packets retained in the output queues 212. The rewriting unit 204 then determines whether the ECN flag in each of the identified data packets is "11" (Step S108). If the ECN flag in any one of the data packets included in the elephant flow is "11" (Yes at Step S108), the rewriting unit 204 rewrites the ECN flag to "10" (Step S109). The transmitting unit 206 then executes the process at Step S110.

If the ECN flag in the data packets included in the elephant flow is not "11" (No at Step S108), the rewriting unit 204 does not perform the process of rewriting the ECN flag to "10", and the transmitting unit 206 executes the process at Step S110.

Data Packet Forwarding

Figure 8:
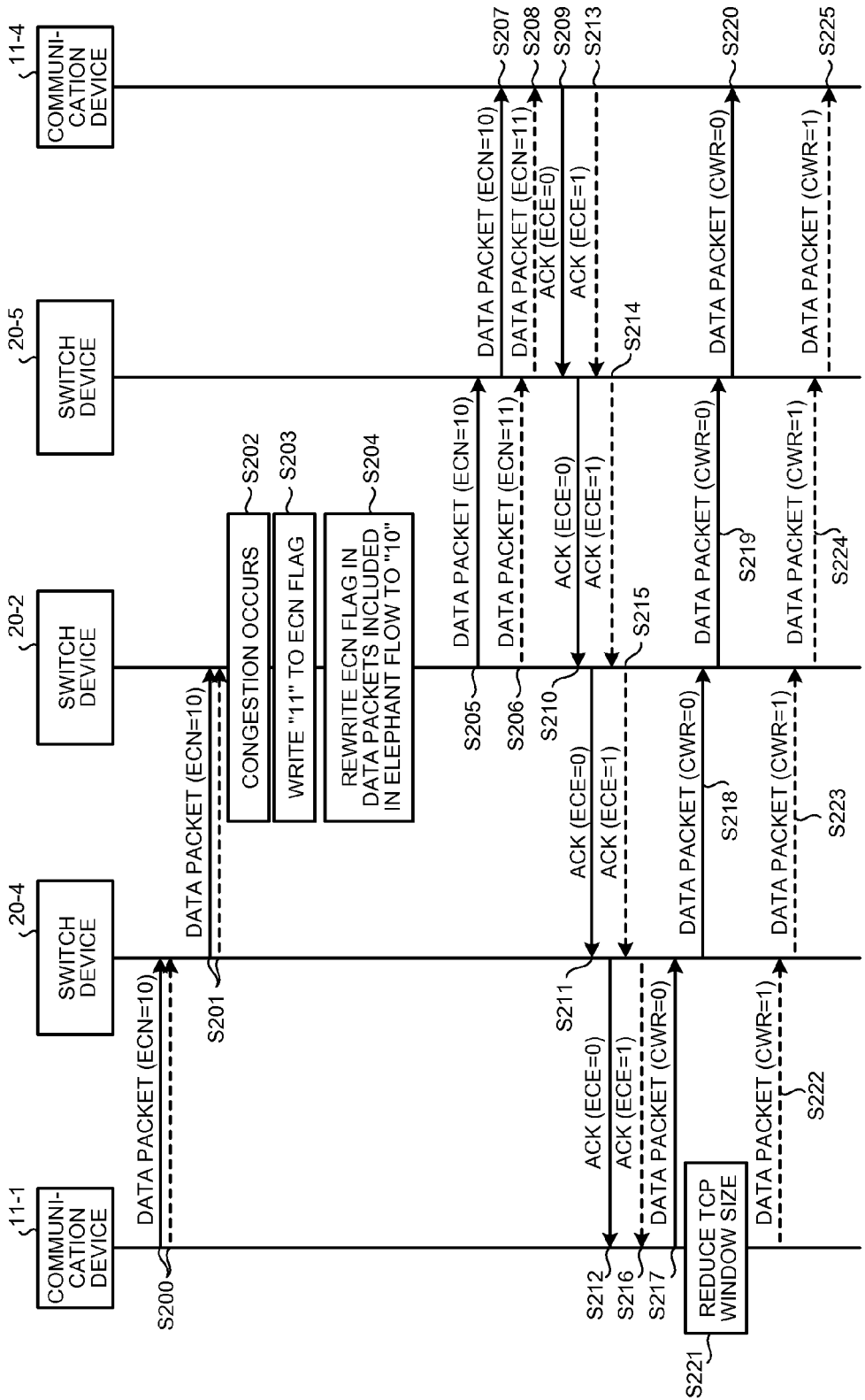
FIG. 8 is a schematic illustrating an example how data packets are forwarded in the first embodiment.

FIG. 8 is a schematic illustrating an example how data packets are forwarded in the first embodiment. Illustrated in FIG. 8 is an example how data packets are forwarded when the data packets are transmitted from the communication device 11-1 that is the sender of the data packets to the communication device 11-4 that is the receiver in the information processing system 1 illustrated in FIG. 1. Also illustrated in FIG. 8 is an example how the data packets are forwarded when congestion occurs in the switch device 20-2. In FIG. 8, the arrows in a solid line represent forwarding of a data packet included in an elephant flow, and the arrows in a dotted line represents forwarding of a data packet included in a mouse flow.

To begin with, the communication device 11-1 sets "10" to the ECN flag in the data packet included in the elephant flow and the data packet included in the mouse flow, and transmits the data packets to the switch device 20-4 (Step S200). Because the switch device 20-4 is not congested, the ECN writing unit 205 in the switch device 20-4 does not write "11" to the ECN flags.

The identifying unit 203 in the switch device 20-4 then identifies data packets included in an elephant flow, among those in the output queues 212. The rewriting unit 204 in the switch device 20-4 then determines whether the ECN flag in each of the identified data packets is "11". In the example illustrated in FIG. 8, because there is no congestion in the switch device 20-4, the ECN flag in each of the data packets included in the elephant flow is "10". The rewriting unit 204 therefore does not rewrite the ECN flag in each of the data packets included in the elephant flow. The transmitting unit 206 then transmits the data packets to the switch device 20-2 (Step S201).

When congestion occurs in the switch device 20-2 (Step S202), the ECN writing unit 205 in the switch device 20-2 writes "11" to the ECN flag in each of the data packets in the output queue 212 in which the amount of data becomes equal to or more than the predetermined threshold (Step S203). The identifying unit 203 in the switch device 20-2 then identifies the data packets included in the elephant flow, among those in the output queues 212. The rewriting unit 204 in the switch device 20-4 then determines whether the ECN flag in each of the data packets included in the elephant flow is "11".

In the example illustrated in FIG. 8, because the ECN flag in each of the data packets included in the elephant flow is "11", the rewriting unit 204 in the switch device 20-2 rewrites the ECN flag in each of the data packets included in the elephant flow to "10" (Step S204). The transmitting unit 206 then transmits the data packets to the switch device 20-5 (Step S205, Step S206). At this time, the ECN flag in each of the data packets included in the elephant flow is "10", and the ECN flag in each of the data packets included in the mouse flow is "11".

Because the switch device 20-5 is not congested, the ECN writing unit 205 in the switch device 20-4 does not write "11" to the ECN flag. Because the data packets included in the elephant flow, among those in the output queues 212, have the ECN flag written with "10", the rewriting unit 204 in the switch device 20-5 does not rewrite the ECN flag. As a result, the transmitting unit 206 in the switch device 20-5 transmits the data packets included in the elephant flow, the data packets being written with the ECN flag of "10", to the communication device 11-4 (Step S207). The transmitting unit 206 in the switch device 20-5 transmits the data packets included in the mouse flow, the data packets being written with an ECN flag of "11", to the communication device 11-4 (Step S208).

Because the ECN flag in each of the data packets included in the elephant flow is "10", the communication device 11-4 transmits ACK packets each written with an ECE flag of "0" to the switch device 20-5 (Step S209). The ACK packets each written with an ECE flag of "0" are transmitted to the communication device 11-1, via the switch device 20-5, the switch device 20-2, and the switch device 20-4 (Step S210 to Step S212).

The communication device 11-4 also transmits ACK packets written with an ECE flag of "1" to the switch device 20-5 because the ECN flag in each of the data packets included in the mouse flow is "11" (Step S213). The ACK packets each written with an ECE flag of "1" are transmitted to the communication device 11-1 via the switch device 20-5, the switch device 20-2, and the switch device 20-4 (Step S214 to Step S216).

For the transmissions of the data packets included in the elephant flow, because the ACK packets each written with an ECE flag of "0" are received, the communication device 11-1 keeps transmitting the data packets without performing the control of reducing the TCP window size (Step S217 to Step S220). At this time, "0" is set to the CWR in the TCP header of each of the data packets.

For the transmissions of the data packets included in the mouse flow, because the ACK packets each written with an ECE flag of "1" are received, the communication device 11-1 reduces the TCP window size to a half, for example (Step S221). The communication device 11-1 then transmits the data packets included in the mouse flow based on the reduced TCP window size (Step S222 to Step S225). At this time, "1" is set to the CWR in the TCP header of each of the data packets.

Advantageous Effects

As described above, for the data packets included in a mouse flow, the switch device 20 does not rewrite the ECN flag in the header of each of the data packets even if the ECN flag is "11" indicating congestion. The source communication device 11 therefore performs the control of reducing the TCP window size for the data packets included in the mouse flow. In this manner, the transmission rate is reduced for the data packets included in the mouse flow, so as to allow the congestion to be resolved.

By contrast, for the data packets included in an elephant flow, if the ECN flag in the header is "11" indicating congestion, the switch device 20 rewrites the ECN flag to "10" indicating no congestion. This prevents the source communication device 11 from performing the control of reducing the TCP window size for the data packets included in an elephant flow. The transmission rate of the data packets included in an elephant flow therefore drops less, so the reduction in the throughput of the elephant flow can be suppressed.

[b] Second Embodiment

Block Diagram of Switch Device 20

Figure 9:
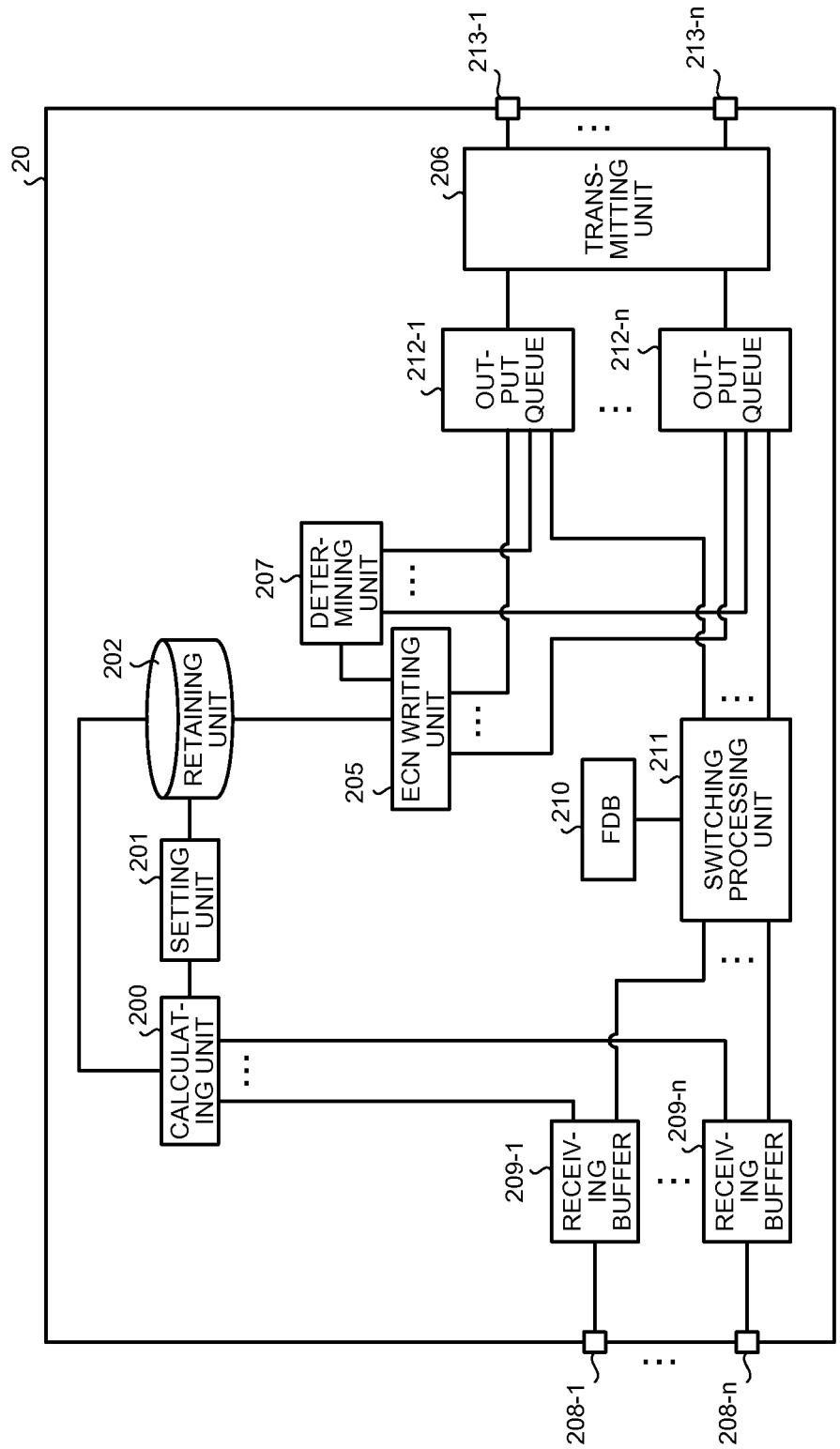
FIG. 9 is a block diagram illustrating an example of a switch device according to a second embodiment.

FIG. 9 is a block diagram illustrating an example of a switch device 20 according to a second embodiment. The switch device 20 includes the calculating unit 200, the setting unit 201, the retaining unit 202, the ECN writing unit 205, the transmitting unit 206, and a determining unit 207. The switch device 20 also includes the receiving ports 208-1 to 208-n, the receiving buffers 209-1 to 209-n, the FDB 210, the switching processing unit 211, the output queues 212-1 to 212-n, and the transmission ports 213-1 to 213-n.

The switch device 20 according to the second embodiment is different from the switch device 20 according to the first embodiment in that, when congestion occurs, "11" is written to the ECN flag of each of the data packets included in a mouse flow, but "11" is not written to the ECN flag of the data packets included in an elephant flow. Except for the points described below, the components given the same reference numerals in FIG. 9 as those in FIG. 2 have the same or similar functions as those in the FIG. 2, so that the explanations thereof are omitted herein.

The determining unit 207 monitors the amount of data in each of the output queues 212, and determines whether the amount of data in any one of the output queues 212 is equal to or more than the predetermined threshold. The predetermined threshold is, for example, 65 packets, when the transmission rate of the transmission port 213 is 10 gigabits per second, for example. If the determining unit 207 determines that the amount of data in any one of the output queues 212 is equal to or more than the predetermined threshold, the determining unit 207 sends information of the output queue 212 in which the amount of data is equal to or more than the predetermined threshold to the ECN writing unit 205.

When the information of the output queue 212 in which amount of data is equal to or more than the predetermined threshold is received from the determining unit 207, the ECN writing unit 205 identifies the data packets included in a mouse flow, from those retained in the output queues 212, by referring to the flow table 2020.

For example, the ECN writing unit 205 identifies the Flow_ID of the flow including the data packet based on the flow table 2020 and the header information of the data packet. The ECN writing unit 205 then identifies the data packets included in the flow having the E-flag of "0" mapped to the identified Flow_ID, that is, identifies the data packet included in a mouse flow.

The ECN writing unit 205 then writes "11" indicating congestion to the ECN flag in the header of each of the data packets included in the mouse flow, among those in the output queues 212. The ECN writing unit 205 does not write "11" to the ECN flag in the header of each of the data packets included in an elephant flow, among those in the output queues 212.

Operation of Switch Device 20

Figure 10:
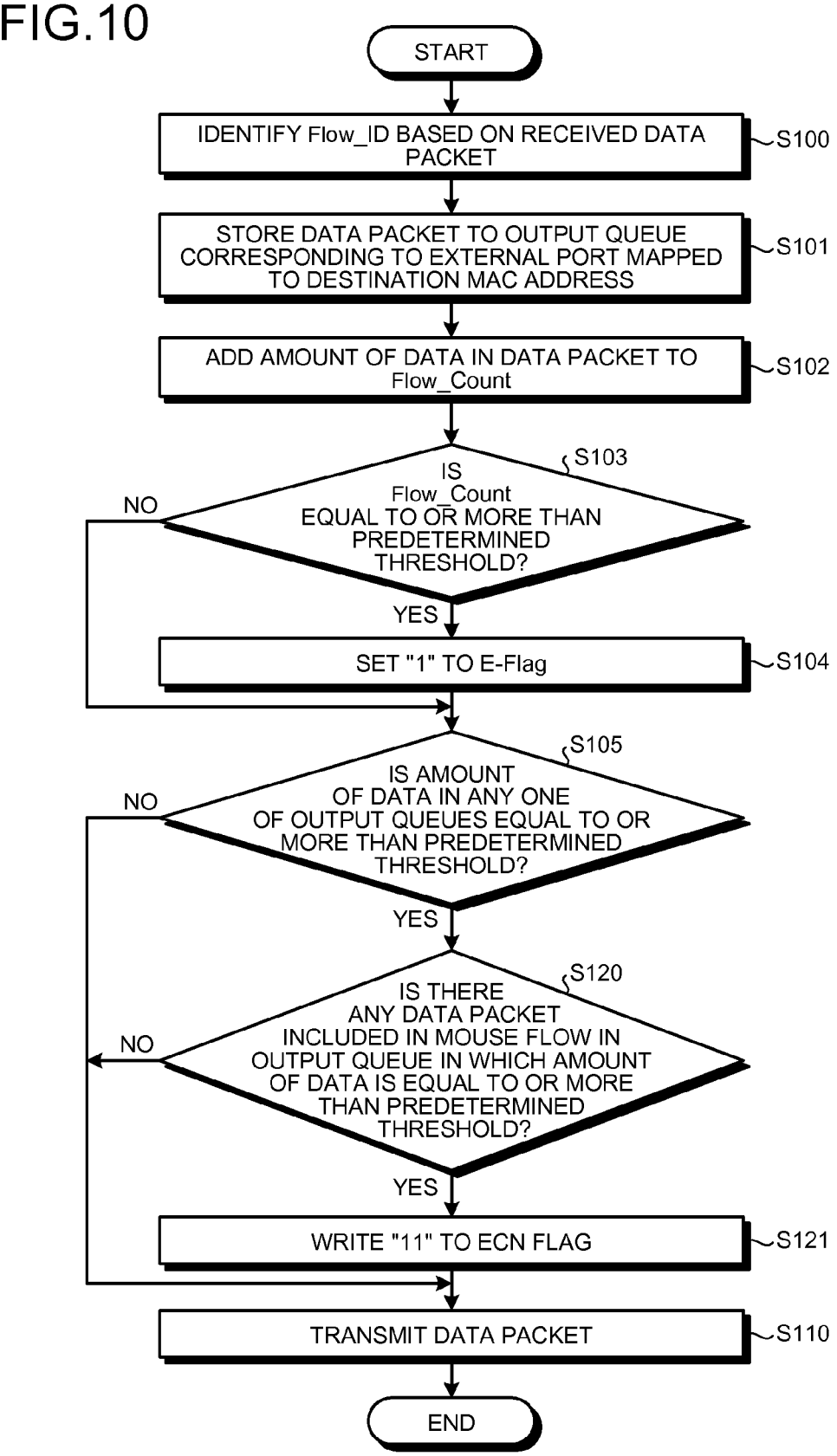
FIG. 10 is a flowchart illustrating an example of an operation of the switch device according to the second embodiment.

FIG. 10 is a flowchart illustrating an example of an operation of the switch device 20 according to the second embodiment. Except for the points described below, the processes given the same reference numerals in FIG. 10 as those in FIG. 7 are the same or similar processes as those in FIG. 7, so that the explanations thereof are omitted herein.

At Step S105, the determining unit 207 determines whether the amount of data in any one of the output queues 212 is equal to or more than the predetermined threshold, by referring to the amount of data in each of the output queues 212 (Step S105). If the amounts of data in all of the output queues 212 are less than the predetermined threshold (No at Step S105), the transmitting unit 206 executes the process at Step S110.

If the amount of data in any one of the output queues 212 is equal to or more than the predetermined threshold (Yes at Step S105), the determining unit 207 sends the information of the output queue 212 in which amount of data is equal to or more than the predetermined threshold to the ECN writing unit 205. The ECN writing unit 205 determines whether there is any data packet included in a mouse flow in the output queue 212 in which the amount of data has become equal to or more than the predetermined threshold, by referring to the flow table 2020 (Step S120).

If there is no data packet included in a mouse flow in the output queue 212 in which the amount of data is equal to or more than the predetermined threshold (No at Step S120), the identifying unit 203 executes the process at Step S107. If there is a data packet included in a mouse flow in the output queue 212 in which the amount of data is equal to or more than the predetermined threshold (Yes at Step S120), the ECN writing unit 205 writes "11" to the ECN flag in the data packet (Step S121). The transmitting unit 206 then executes the process at Step S110.

Advantageous Effects

As described above, the switch device 20 according to the embodiment writes "11" to the ECN flag in each of the data packets included in a mouse flow, when congestion occurs, among the data packets retained in the output queue 212 in which the amount of data becomes equal to or more than the predetermined threshold. The switch device 20 according to the embodiment does not write "11" to the ECN flag in each of the data packets included in an elephant flow, even when congestion occurs, among the data packets retained in the output queue 212 in which the amount of data is equal to or more than the predetermined threshold.

In this manner, for the data packets included in a mouse flow, because "11" indicating congestion is written to the ECN flag in the header, the source communication device 11 is caused to perform the control of reducing the TCP window size. For the data packet included in the elephant flow, because the ECN flag in the header remains to have "10" indicating no congestion, the source communication device 11 does not perform the control of reducing the TCP window size. The transmission rate of the data packets included in an elephant flow therefore drops less, so the reduction in the throughput of the elephant flow can be suppressed.

[c] Third Embodiment

Block Diagram of Communication Device 11

Figure 11:
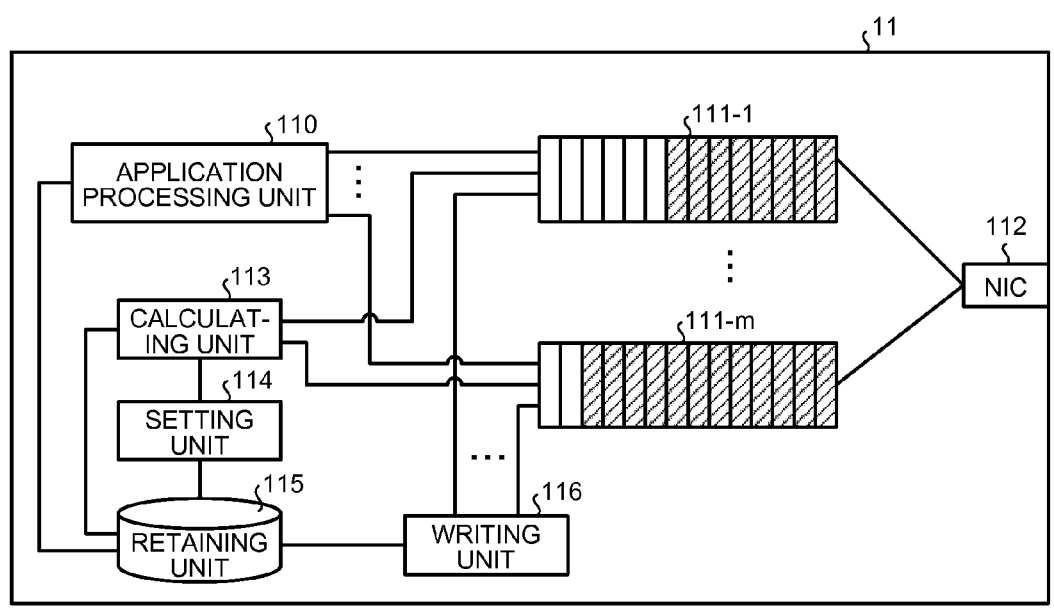
FIG. 11 is a block diagram illustrating an example of a communication device according to a third embodiment.

FIG. 11 is a block diagram illustrating an example of the communication device 11 according to a third embodiment. The communication device 11 according to the embodiment includes the application processing unit 110, the TCP socket buffers 111-1 to 111-m, the NIC 112, a calculating unit 113, a setting unit 114, a retaining unit 115, and a writing unit 116.

The communication device 11 according to the third embodiment is different from the communication device 11 according to the first embodiment in that the former communication device 11 identifies the data packets included in a mouse flow and the data packets included in an elephant flow, and writes identification information to each of the data packets. The switch device 20 according to the embodiment identifies the data packets included in a mouse flow and the data packets included in an elephant flow using the identification information written in each of the data packets. Except for the points described below, the components given the same reference numerals in FIG. 11 as those in the FIG. 6 have the same or similar functions as those in the FIG. 6, so that the explanations thereof are omitted herein.

The retaining unit 115 retains a flow table that is the same as the flow table 2020 explained with reference to FIG. 3, for example. When a data packet is stored in the TCP socket buffer 111, the calculating unit 113 identifies the Flow_ID of the flow including the data packet based on the match fields in the flow table in the retaining unit 115 and the header information of the data packet. The calculating unit 113 then identifies the Flow_Count mapped to the identified Flow_ID in the flow table.

The calculating unit 113 then updates the Flow_Count by adding the amount of data in the data packet stored in the TCP socket buffer 111 to the identified Flow_Count. The setting unit 114 monitors the Flow_Count in the flow table, and sets "1" to the corresponding E-flag when the Flow_Count becomes equal to or more than the predetermined threshold.

When a data packet is stored in the TCP socket buffer 111, the writing unit 116 identifies the Flow_ID of the flow including the data packet based on the match fields in the flow table in the retaining unit 115 and the header information of the data packet. The writing unit 116 extracts the value specified in the E-flag mapped to the identified Flow_ID.

If the extracted E-flag value is "0", the writing unit 116 writes a specific value to the Differentiated Services Code Point (DSCP) field in the header of the data packet stored in the TCP socket buffer 111. The specific value is a value indicating that the data packet is included in a mouse flow, and is "000000", for example. The DSCP field is assigned to the six most significant bits of the DS field illustrated in FIG. 4. If the extracted E-flag value is "1", the writing unit 116 writes a specific value to the DSCP field in the header of the data packet stored in the TCP socket buffer 111. The specific value is a value indicating that the data packet is included in an elephant flow, and is "000011", for example.

In this embodiment, the setting unit 114 determines whether a flow is a mouse flow or an elephant flow based on whether the cumulative amount of data included in the flow is equal to or more than the predetermined threshold, but the determination scheme is not limited thereto. For example, the setting unit 114 may measure the amount of data in each of the TCP socket buffers 111 at a predetermined time interval, e.g., 1 second, for each of the flows. The setting unit 114 may then determine that a flow is an elephant flow when the amount of data measured at the predetermined time interval becomes equal to or more than the predetermined threshold, e.g., 100 kilobytes.

Block Diagram of Switch Device 20

Figure 12:
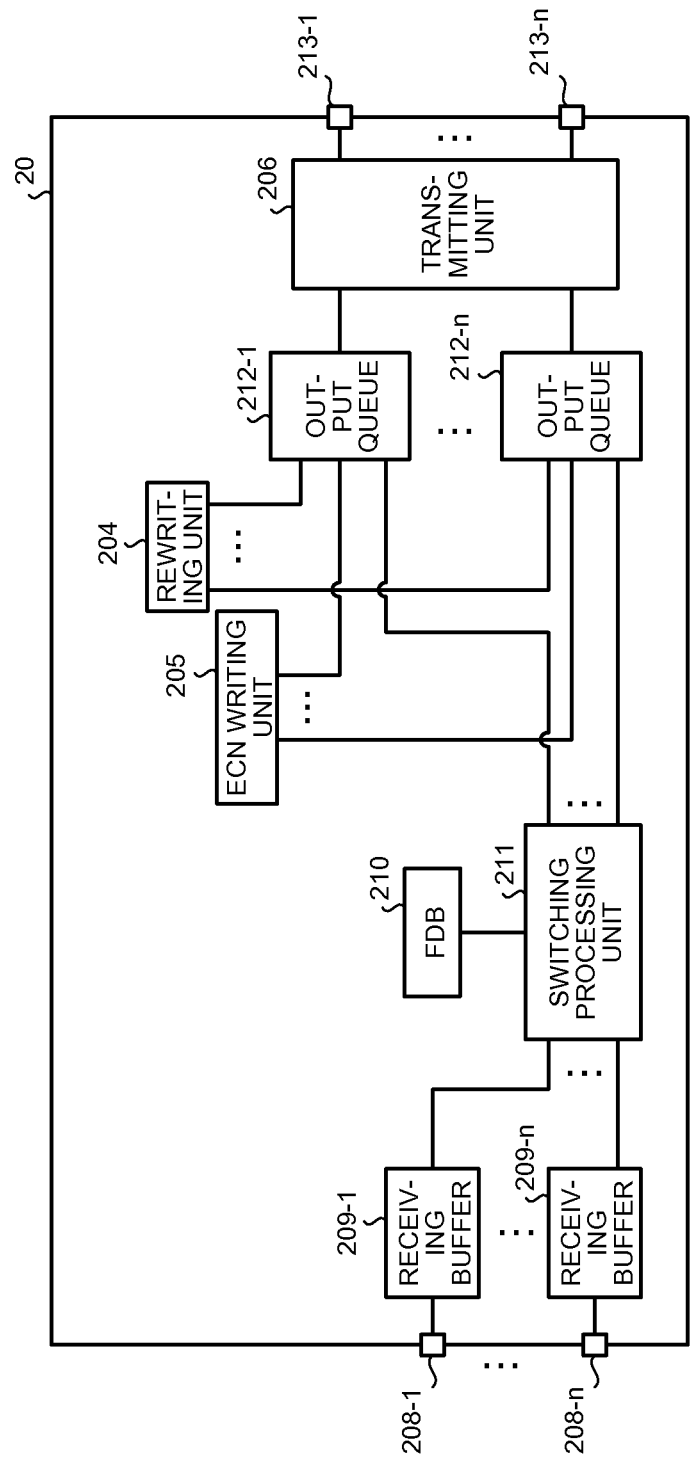
FIG. 12 is a block diagram illustrating an example of a switch device according to the third embodiment.

FIG. 12 is a block diagram illustrating an example of a switch device 20 according to the third embodiment. The switch device 20 includes the rewriting unit 204, the ECN writing unit 205, and the transmitting unit 206. The switch device 20 also includes the receiving ports 208-1 to 208-n, the receiving buffers 209-1 to 209-n, the FDB 210, the switching processing unit 211, the output queues 212-1 to 212-n, and the transmission ports 213-1 to 213-n.

The switch device 20 according to the third embodiment is different from the switch device 20 according to the first embodiment in not having the calculating unit 200, the setting unit 201, the retaining unit 202, and the identifying unit 203. Except for the points described below, the components given the same reference numerals in FIG. 12 as those in the FIG. 2 have the same or similar functions as those in the FIG. 2, so that the explanations thereof are omitted herein.

The rewriting unit 204 identifies the data packets with a DSCP written with the value indicating an elephant flow, by referring to the IP header of each of the data packets in each of the output queues 212. The rewriting unit 204 then determines whether the ECN flag in the IP header is "11" indicating congestion, for each of the identified data packets.

If the ECN flag in the IP header is "11", the rewriting unit 204 rewrites the ECN flag to "10", for example, indicating no congestion. If the ECN flag in the IP header is not "11", the rewriting unit 204 does not rewrite the ECN flag.

Operation of Communication Device 11

Figure 13:
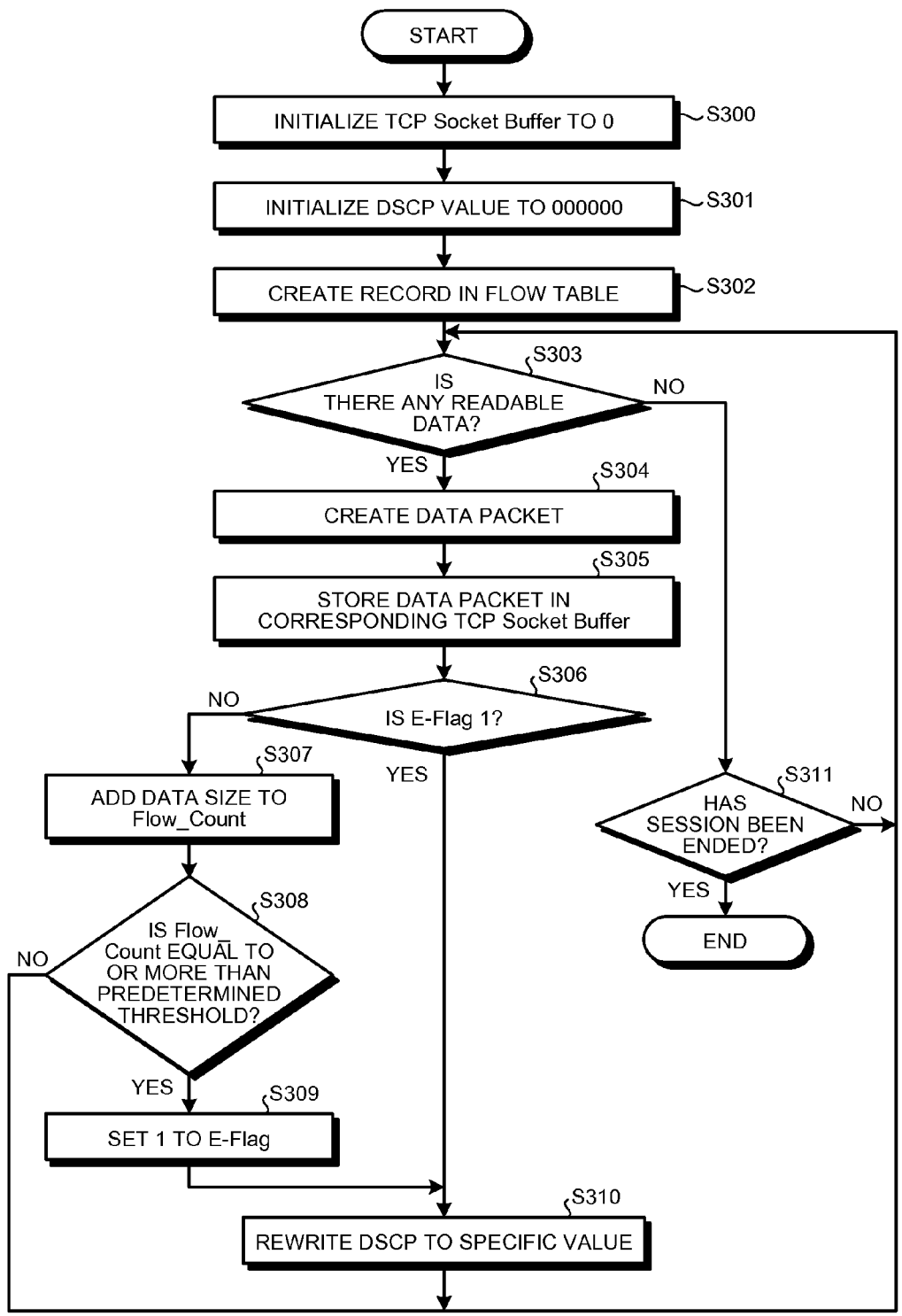
FIG. 13 is a flowchart illustrating an example of an operation of the communication device according to the third embodiment.

FIG. 13 is a flowchart illustrating an example of an operation of the communication device 11 according to the third embodiment. The communication device 11 starts the operation illustrated in this flowchart every time a session is initiated, for example.

To begin with, the application processing unit 110 initializes the TCP socket buffers 111 to zero (Step S300). The application processing unit 110 initializes the DSCP to "000000" (Step S301). The application processing unit 110 then create a record including a Flow_ID, match fields, a Flow_Count, and an E-flag in the flow table in the retaining unit 115 (Step S302). The match fields store therein information for identifying a TCP socket buffer 111, for example. The Flow_Count and the E-flag store therein zero, for example, as an initial value.

The application processing unit 110 then determines whether there is any readable data (Step S303). If there is no readable data (No at Step S303), the application processing unit 110 determines whether the session has been ended (Step S311). If the session has not been ended (No at Step S311), the application processing unit 110 repeats the process at Step S303. If the session has been ended (Yes at Step S311), the communication device 11 ends the process illustrated in this flowchart.

If there is any readable data (Yes at Step S303), the application processing unit 110 reads the data and creates a data packet (Step S304). The application processing unit 110 then stores the created data packet in the corresponding TCP socket buffer 111 initialized at Step S300 (Step S305).

The calculating unit 113 and the writing unit 116 determine whether the E-flag is "1" by referring to the record created at Step S302 (Step S306). If the E-flag is "1" (Yes at Step S306), the writing unit 116 rewrites the DSCP value of the data packet stored in the TCP socket buffer 111 to the specific value, e.g., "000011" (Step S310). The application processing unit 110 then repeats the process at Step S303.

If the E-flag is "0" (No at Step S306), the calculating unit 113 adds the data size of the data packet stored in the TCP socket buffer 111 to the Flow_Count in the record created at Step S302 (Step S307). The setting unit 114 then determines whether the Flow_Count is equal to or more than the predetermined threshold (Step S308).

If Flow_Count is equal to or more than the predetermined threshold (Yes at Step S308), the setting unit 114 sets "1" to the E-flag of the record created at Step S302 (Step S309), and the writing unit 116 executes the process at Step S310. If the Flow_Count is less than the predetermined threshold (No at Step S308), the application processing unit 110 repeats the process at Step S303.

Advantageous Effect

In the embodiment, the communication device 11 determines the data packets included in an elephant flow and the data packets included in a mouse flow, and writes the respective identification information to the respective data packets. In this manner, the processing load of the switch devices 20 can be reduced.

[d] Fourth Embodiment

Block Diagram of Controller 40

Figure 14:
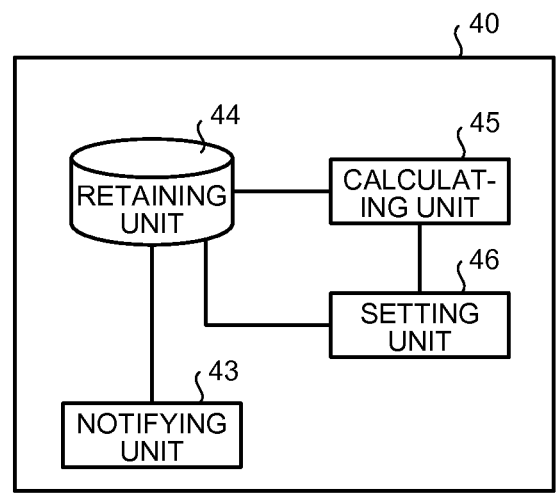
FIG. 14 is a block diagram illustrating an example of a controller according to a fourth embodiment.

FIG. 14 is a block diagram illustrating an example of a controller according to a fourth embodiment. The controller 40 includes a notifying unit 43, a retaining unit 44, a calculating unit 45, and a setting unit 46. The retaining unit 44 retains a flow table that is the same as the flow table 2020 explained with reference to FIG. 3, for example. The fourth embodiment is different from the first embodiment in that the controller 40 distinguishes the elephant flows and the mouse flows, and provides information for identifying each of the flows to each of the switch devices 20. The controller 40 provides, for example, the information for identifying an elephant flow to each of the switch devices 20.

The calculating unit 45 receives information related to the flows, including the amount of data in the data packets passed through the information processing system 1, from application management software (AMS) that manages the data packets passed through the entire information processing system 1. The calculating unit 45 then identifies the Flow_ID of a flow including data packets based on the match fields in the flow table in the retaining unit 44 and the received information related to the flows.

The calculating unit 45 identifies the Flow_Count mapped to the identified Flow_ID in the flow table. The calculating unit 45 then updates the Flow_Count by adding the amount of data in the data packet to the identified Flow_Count. The setting unit 46 monitors the Flow_Count in the flow table, and sets "1" to the E-flag when the Flow_Count becomes equal to or more than the predetermined threshold.

The notifying unit 43 monitors the E-flag of each of the flows in the flow table. When the E-flag changes from "0" to "1", the notifying unit 43 identifies the switch device 20 through which the flow in which the E-flag has changed from "0" to "1" has passed. The controller 40 retains the topology of the information processing system 1. The notifying unit 43 identifies the switch device 20 through which the flow in which the E-flag has changed from "0" to "1" has passed, by referring to the topology of the information processing system 1, for example.

The notifying unit 43 then transmits the information for identifying the flow in which the E-flag has changed from "0" to "1" to the identified switch device 20. Examples of the information for identifying the flow include the source MAC address, the destination MAC address, the source IP address, the destination IP address, and the protocol number.

Block Diagram of Switch Device 20

Figure 15:
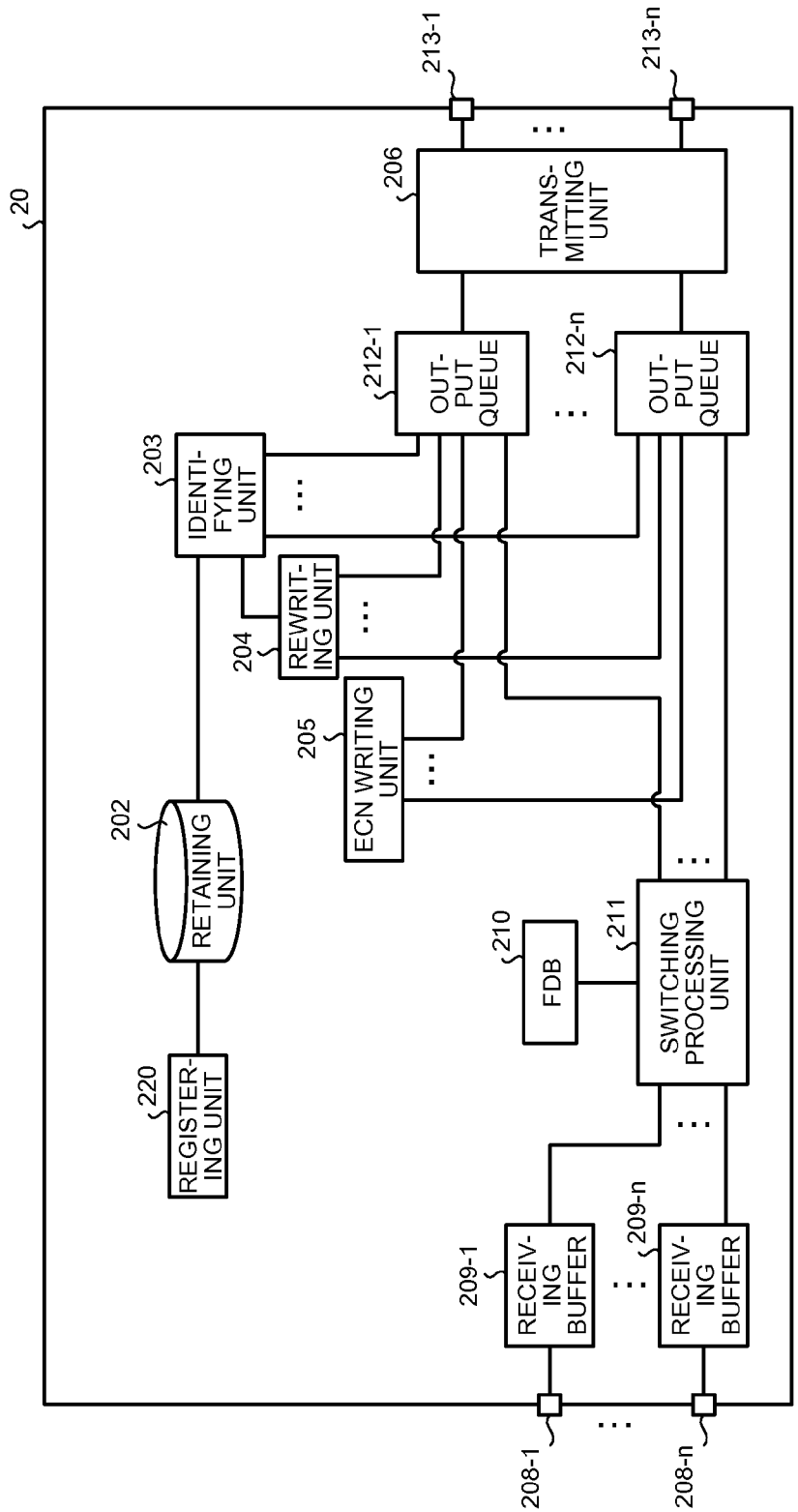
FIG. 15 is a block diagram illustrating an example of a switch device according to the fourth embodiment.

FIG. 15 is a block diagram illustrating an example of a switch device 20 according to the fourth embodiment. The switch device 20 includes the retaining unit 202, the identifying unit 203, the rewriting unit 204, the ECN writing unit 205, and the transmitting unit 206. The switch device 20 also includes the receiving ports 208-1 to 208-n, the receiving buffers 209-1 to 209-n, the FDB 210, the switching processing unit 211, the output queues 212-1 to 212-n, the transmission ports 213-1 to 213-n, and a registering unit 220.

The switch device 20 according to the fourth embodiment is different from the switch device 20 according to the first embodiment in having the registering unit 220 instead of the calculating unit 200 and the setting unit 201. Except for the points described below, the components given the same reference numerals in FIG. 15 as those in the FIG. 2 have the same or similar functions as those in the FIG. 2, so that the explanations thereof are omitted herein.

When the registering unit 220 receives information for identifying the flow from the controller 40, the registering unit 220 identifies the match fields 2022 mapped to the received information in the flow table 2020, by referring to the flow table 2020. The registering unit 220 then sets "1" to the E-flag 2024 mapped to the identified match fields 2022.

Operation of Controller 40

Figure 16:
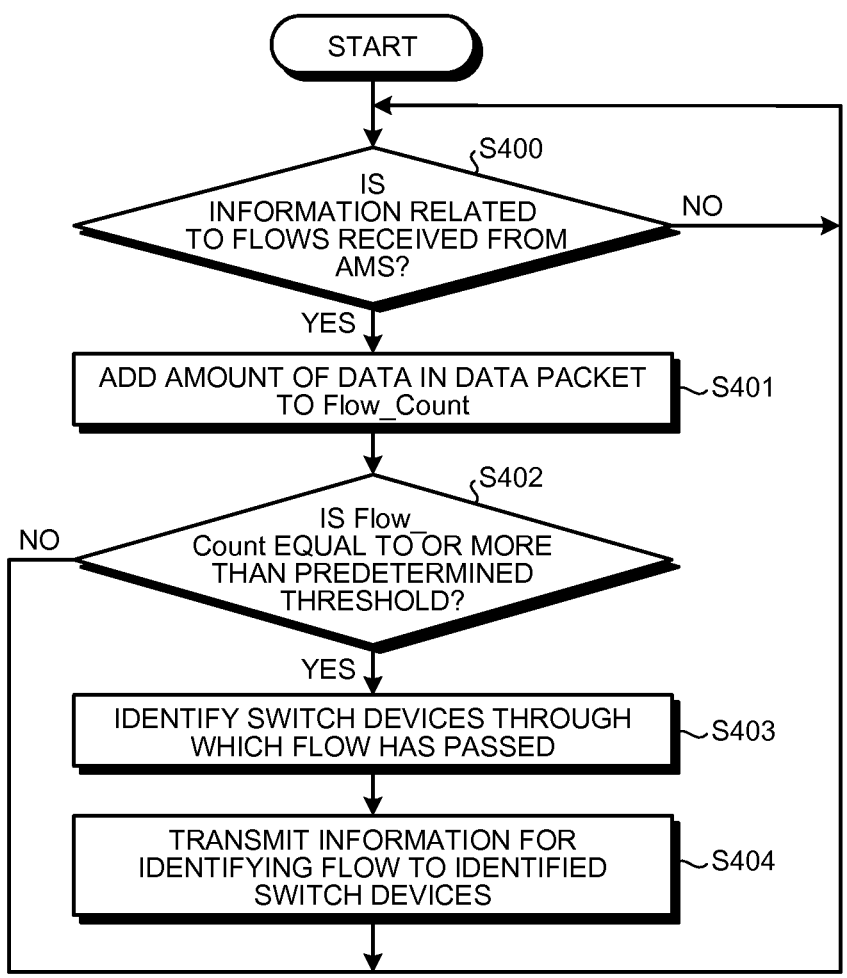
FIG. 16 is a flowchart illustrating an example of an operation of the controller according to the fourth embodiment.

FIG. 16 is a flowchart illustrating an example of an operation of the controller 40 according to the fourth embodiment.

The calculating unit 45 determines whether the information related to the flows including the data packets having passed through the information processing system 1 has been received from the AMS (Step S400). If the information related to the flows has been received from the AMS (Yes at Step S400), the calculating unit 45 identifies the Flow_ID of the flow including the data packet based on the match fields in the flow table in the retaining unit 44 and the received information related to the flows. The calculating unit 45 then identifies the Flow_Count mapped to the identified Flow_ID in the flow table.

The calculating unit 45 then updates the Flow_Count by adding the amount of data in the data packet to the identified Flow_Count (Step S401). The setting unit 46 determines whether the Flow_Count is equal to or more than the predetermined threshold (Step S402). If the Flow_Count is less than the predetermined threshold (No at Step S402), the calculating unit 45 repeats the process at Step S400.

If the Flow_Count is equal to or more than the predetermined threshold (Yes at Step S402), the notifying unit 43 identifies the switch device 20 through which the flow with the E-flag having changed from "0" to "1" has passed (Step S403). The notifying unit 43 then transmits the information identifying the flow with the E-flag having changed from "0" to "1" to the identified switch device 20 (Step S404), and the calculating unit 45 repeats the process at Step S400.

Advantageous Effects

In the fourth embodiment, the controller 40 distinguishes the elephant flows and the mouse flows, and provides information for identifying the elephant flows to each of the switch devices 20. In this manner, the processing load of the switch devices 20 can be reduced.

[e] Fifth Embodiment

Figure 17:
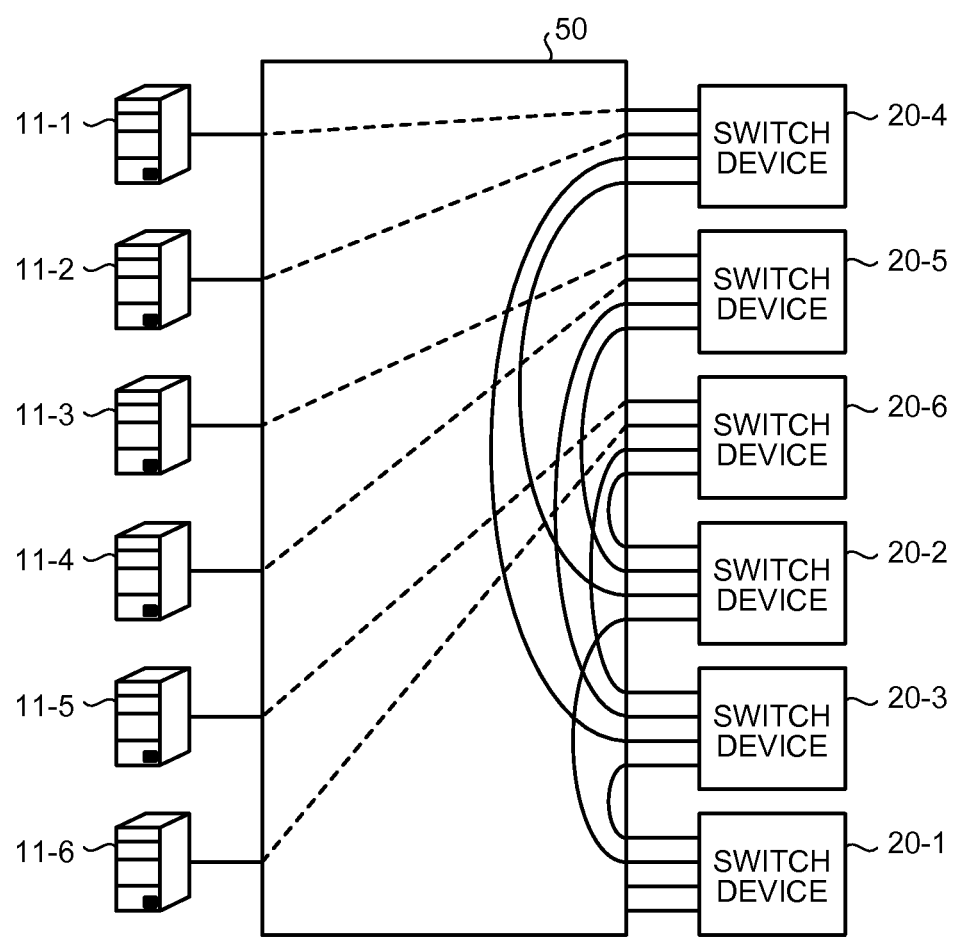
FIG. 17 is a schematic illustrating an example of an information processing system according to a fifth embodiment.

FIG. 17 is a schematic illustrating an example of an information processing system 1 according to a fifth embodiment. The information processing system 1 according to this embodiment includes the switch devices 20-1 to 20-6, the communication devices 11-1 to 11-*n*, and a patch panel device 50. In this embodiment, the switch devices 20 may be conventional switch devices generally used, and do not need to have the functions of the switch device 20 described in the first to the fourth embodiment.

The patch panel device 50 is a device that connects and branches the switch devices 20 and the communication devices 11 at the wire level. In FIG. 17, the dotted lines indicated in the patch panel device 50 represent the connections between the switch devices 20 and the communication devices 11, and the solid lines indicated in the patch panel device 50 represent the connections between the switch devices 20. The connections illustrated as an example in FIG. 17 represent the topology illustrated in FIG. 1, for example.

Block Diagram of Patch Panel Device 50

Figure 18:
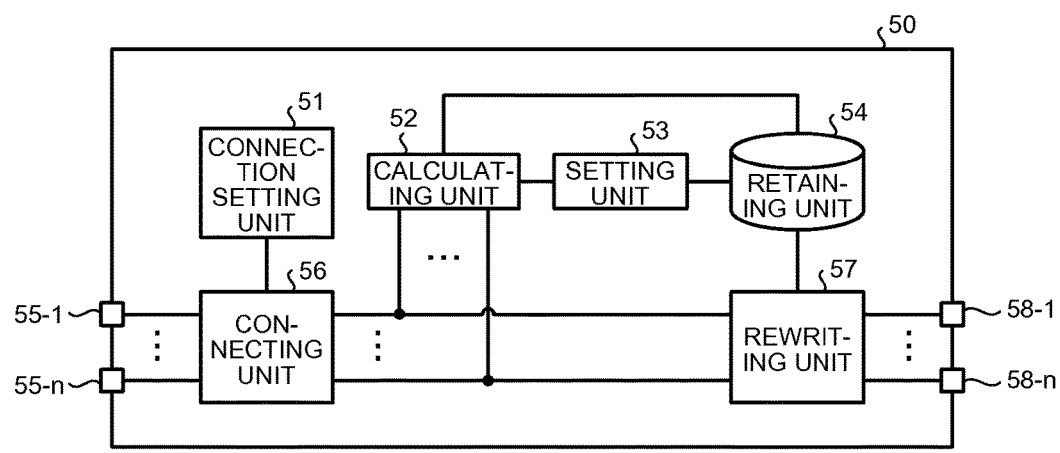
FIG. 18 is a block diagram illustrating an example of a patch panel device.

FIG. 18 is a block diagram illustrating an example of the patch panel device 50. The patch panel device 50 includes a connection setting unit 51, a calculating unit 52, a setting unit 53, a retaining unit 54, a plurality of input ports 55-1 to 55-*n*, a connecting unit 56, a rewriting unit 57, and a plurality of output ports 58-1 to 58-*n*. Hereinafter, the input ports 55-1 to 55-*n* are generally referred to as input ports 55 when each of the input ports 55-1 to 55-*n* is not distinguished from one another, and the output ports 58-1 to 58-*n* are generally referred to as output ports 58 when each of the output ports 58-1 to 58-*n* is not distinguished from one another.

The connection setting unit 51 retains setting information for instructing the connections specified by a user to be established between the input ports 55 and the output ports 58. The connecting unit 56 connects the input ports 55 and the output ports 58 at the wire level, based on the setting information retained in the connection setting unit 51.

The retaining unit 54 retains a flow table that is the same as the flow table 2020 explained with reference to FIG. 3, for example. The calculating unit 52 identifies, for each of the data packets received at each of the input ports 55, the Flow_ID of the flow including the data packet, based on the match fields in the flow table and the header information of the data packet. The calculating unit 52 then identifies the Flow_Count mapped to the identified Flow_ID in the flow table.

The calculating unit 52 then updates the Flow_Count by adding the amount of data in the data packet to the identified Flow_Count. The setting unit 53 monitors the Flow_Count in the flow table, and sets "1" to the corresponding E-flag when the Flow_Count becomes equal to or more than the predetermined threshold.

The rewriting unit 57 monitors the header information of each of the data packets transmitted from each of the output ports 58, and identifies the data packet with an ECN flag written with "11". The rewriting unit 57 then determines whether the data packet is included in an elephant flow, by referring to the header information of the identified data packet and the flow table in the retaining unit 54. If the data packet is included in the elephant flow, the rewriting unit 57 rewrites the ECN flag in the header of the data packet to "10".

Advantageous Effects

According to the fifth embodiment, even with general switch devices without the functions of the first to the fourth embodiments, the ECN flag in a data packet included in an elephant flow can be rewritten to "10" when congestion occurs. In this manner, the congestion can be resolved by performing the control of reducing the TCP window size to the data packets included in a mouse flow, while suppressing the reduction in the throughput of the data packets included in an elephant flow.

Modifications

The technologies according to the application are not limited to the embodiments described above, and may be modified variously without deviating from the essence of the application.

For example, in the embodiments described above, the ECN flag in the data packets included in an elephant flow, in which the amount of data is large, is rewritten to "10" indicating no congestion when congestion occurs, but the technologies according to the application are not limited thereto. For example, each flow may be assigned with a priority at which the throughput is maintained, and the switch device 20 may rewrite the ECN flag in the data packets included in a flow having a relatively high priority to "10" indicating no congestion when congestion occurs. The priorities of the flows are set in advance by an administrator of the information processing system 1, for example.

In this manner, if a mouse flow, in which the amount of data is smaller, is assigned with a higher priority at which the throughput is maintained than those of the other flows, the control of reducing the TCP window size is not performed even when congestion occurs to allow the throughput to be maintained. Furthermore, when congestion occurs due to a plurality of elephant flows, in which the amount of data is large, the control of reducing the TCP window size may be performed to the elephant flows having relatively low priorities at which the throughput is maintained, so that the congestion can be resolved more quickly.

Figure 19:
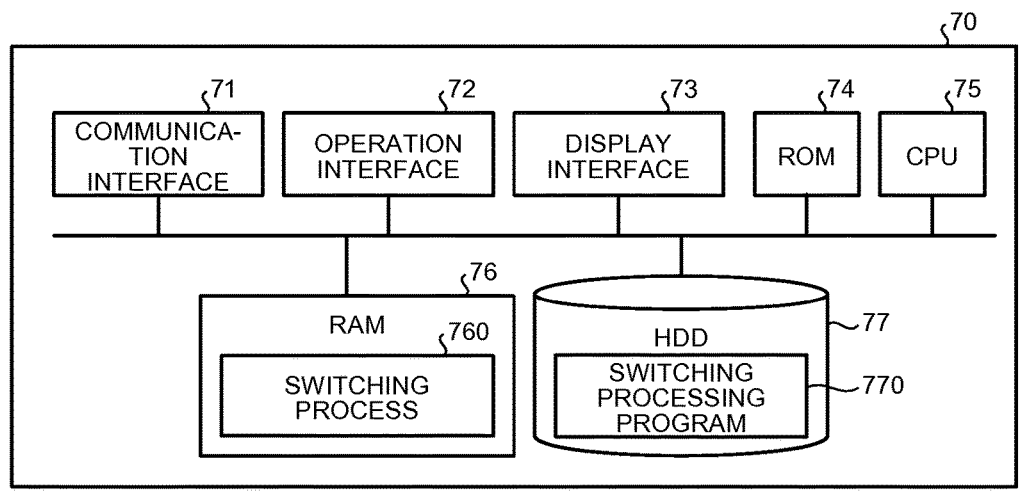
FIG. 19 is a schematic for explaining an example of a computer implementing the functions of the switch device.

The various processes explained in the embodiments described above can be implemented by causing a computer to execute a computer program prepared in advance. Explained now is an example of a computer for executing a computer program having the same functions as those described in the embodiments. FIG. 19 is a schematic illustrating an example of a computer 70 for implementing the functions of the switch devices 20.

In FIG. 19, the computer 70 for implementing the functions of the switch devices 20 includes a communication interface 71, an operation interface 72, a display interface 73, a read only memory (ROM) 74, a central processing unit (CPU) 75, a random-access memory (RAM) 76, and a hard disk drive (HDD) 77.

A switching processing program 770 is stored in the HDD 77 in advance, as illustrated in FIG. 19, for example. The CPU 75 reads the switching processing program 770 from the HDD 77 and loads the program onto the RAM 76. The switching processing program 770 may be integrated or distributed as appropriate in the same manner as the components illustrated in FIG. 2, 9, 12, or 15. Furthermore, all of the data stored in the HDD 77 does not always need to be stored in the HDD 77, and data used for a process may be stored in the HDD 77.

The CPU 75 causes the switching processing program 770 to function as a switching process 760. The switching process 760 loads various types of data read from the HDD 77 onto an area assigned in the RAM 76 as appropriate, and executes various processes based on the various types of loaded data.

The switch device 20 according to the first embodiment implements the same functions as those of the calculating unit 200, the setting unit 201, the retaining unit 202, the identifying unit 203, the rewriting unit 204, the ECN writing unit 205, the transmitting unit 206, the receiving buffers 209, the FDB 210, the switching processing unit 211, and the output queues 212, by causing the CPU 75 to read and execute the switching processing program 770.

Furthermore, the switch device 20 according to the second embodiment implements the same functions as those of the calculating unit 200, the setting unit 201, the retaining unit 202, the ECN writing unit 205, the transmitting unit 206, the determining unit 207, the receiving buffers 209, the FDB 210, the switching processing unit 211, and the output queues 212, by causing the CPU 75 to read and execute the switching processing program 770.

Furthermore, the switch device 20 according to the third embodiment implements the same functions as those of the rewriting unit 204, the ECN writing unit 205, the transmitting unit 206, the receiving buffer 209, the FDB 210, the switching processing unit 211, and the output queues 212 by causing the CPU 75 to read and execute the switching processing program 770.

Furthermore, the switch device 20 according to the fourth embodiment implements the same functions as those of the retaining unit 202, the identifying unit 203, the rewriting unit 204, the ECN writing unit 205, the transmitting unit 206, the receiving buffers 209, the FDB 210, the switching processing unit 211, the output queues 212, and the registering unit 220, by causing the CPU 75 to read and execute the switching processing program 770.

The switching process 760 according to the first embodiment executes the processes executed in the switch device 20 illustrated in FIG. 2, e.g., the processes illustrated in FIG. 7. The switching process 760 according to the second embodiment also executes the process executed in the switch device 20 illustrated in FIG. 9, e.g., the process illustrated in FIG. 10. All of the processing units virtually implemented by the CPU 75 do not always need to be implemented by the CPU 75, and only the processing units used for a process may be virtually implemented.

The switching processing program 770 does not necessarily need to be stored in the HDD 77 or in the ROM 74 from the beginning. For example, The program may be stored in a portable recording medium such as a flexible disk (FD), a compact disc read-only memory (CD-ROM), a digital versatile disc (DVD), a magneto-optical disk, an integrated circuit (IC) card to be mounted on the computer 70, and the computer 70 may acquire the computer program from the corresponding portable recording medium, and execute the program. The computer 70 may execute the computer program acquired from another computer or a server device storing therein the programs over a public line, the Internet, a local area network (LAN), or a wide area network (WAN).

According to one aspect of the application, it is possible to allow the efficiency of the data packet handling to be reduced less when congestion occurs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch device that receives a data packet transmitted by a transmitter device and transmits the data packet to a receiver device, the switch device comprising:

a memory; and a processor coupled to the memory, wherein the processor executes a process comprising:

retaining a flow table that maps each flow including a series of data packets transmitted from the transmitter device to the receiver device to a flag indicating whether the flow is a large flow with which amount of data transmitted by the flow is equal to or more than a first threshold;

receiving the data packets transmitted by the transmitter device;

storing the data packets received by the receiving in one of a plurality of output queues provided for respective transmission ports based on a destination of the data packets;

identifying data packets included in the large flow among the data packets received by the receiving, by referring to the flow table;

referring to congestion notification information notifying whether congestion has occurred, the congestion notification information being included in each of the data packets included in the large flow identified by the identifying, and rewriting the information indicating that congestion has occurred to information indicating that no congestion has occurred when information indicating that congestion has occurred is included in the congestion notification information under a situation where the congestion has occurred;

transmitting the data packets in the output queue determining whether an amount of data in any one of the output queues is equal to or more than a second threshold; and writing, when the determining determines that the amount of data in any one of the output queues is equal to or more than the second threshold, the information indicating that congestion has occurred to the congestion notification information of a data packet included in a flow mapped with a flag indicating that the amount of transmitted data is less than a first threshold, but does not write the information indicating that congestion has occurred to the congestion notification information in a data packet included in a flow mapped with a flag indicating that the amount of transmitted data is equal to or more than the first threshold, among the data packets received by the receiving, wherein the rewriting is not performed for the congestion notification information included in each of the data packets not identified by the identifying under the situation where the congestion has occurred.

2. The switch device according to claim 1, wherein the process further comprising:

calculating a cumulative amount of data in the series of the data packets in each of the flows transmitted from the transmitter device to the receiver device; and setting the flag indicating that the amount of transmitted data is equal to or more than the first threshold, when the cumulative amount of data calculated by the calculating becomes equal to or more than the first threshold, to the flow mapped to the cumulative amount in the flow table.

3. An information processing system comprising:

a transmitter device;

a receiver device; and a switch device that forwards a data packet transmitted by the transmitter device to the receiver device, the switch device comprising:

a memory; and a processor coupled to the memory, wherein the processor executes a process comprising:

retaining a flow table that maps each flow including a series of data packets transmitted from the transmitter device to the receiver device to a flag indicating whether the flow is a large flow with which amount of data transmitted by the flow is equal to or more than a predetermined threshold;

receiving the data packets transmitted by the transmitter device;

storing the data packets received by the receiving in one of a plurality of output queues provided for respective transmission ports based on a destination of the data packets;

identifying data packets included in the large flow among the data packets received by the receiving, by referring to the flow table;

referring to congestion notification information notifying whether congestion has occurred, the congestion notification information being included in each of the data packets included in the large flow identified by the identifying, and rewriting the information indicating that congestion has occurred to information indicating that no congestion has occurred when information indicating that congestion has occurred is included in the congestion notification information under a situation where the congestion has occurred;

transmitting the data packets in the output queue;

determining whether an amount of data in any one of the output queues is equal to or more than a second threshold; and writing, when the determining determines that the amount of data in any one of the output queues is equal to or more than the second threshold, the information indicating that congestion has occurred to the congestion notification information of a data packet included in a flow mapped with a flag indicating that the amount of transmitted data is less than a first threshold, but does not write the information indicating that congestion has occurred to the congestion notification information in a data packet included in a flow mapped with a flag indicating that the amount of transmitted data is equal to or more than the first threshold, among the data packets received by the receiving, wherein the rewriting is not performed for the congestion notification information included in each of the data packets not identified by the identifying under the situation where the congestion has occurred.

4. A method for controlling a switch device that receives a data packet transmitted by a transmitter device and transmits the data packet to a receiver device, the method comprising:

receiving the data packet transmitted by the transmitter device;

storing the received data packet in one of a plurality of output queues provided for respective transmission ports based on a destination of the data packet;

referring to a flow table that maps each flow including a series of data packets transmitted from the transmitter device to the receiver device to a flag indicating whether the flow is a large flow with which amount of data transmitted by the flow is equal to or more than a predetermined threshold, and identifying data packets included in the large flow among the received data packets;

referring to congestion notification information notifying whether congestion has occurred, the congestion notification information being included in each of the identified data packets included in the large flow, and rewriting the information indicating that congestion has occurred to information indicating that no congestion has occurred when information indicating that congestion has occurred is included in the congestion notification information under a situation where the congestion has occurred;

transmitting the data packet in the output queue;

determining whether an amount of data in any one of the output queues is equal to or more than a second threshold; and writing, when the determining determines that the amount of data in any one of the output queues is equal to or more than the second threshold, the information indicating that congestion has occurred to the congestion notification information of a data packet included in a flow mapped with a flag indicating that the amount of transmitted data is less than a first threshold, but does not write the information indicating that congestion has occurred to the congestion notification information in a data packet included in a flow mapped with a flag indicating that the amount of transmitted data is equal to or more than the first threshold, among the data packets received by the receiving, wherein the rewriting is not performed for the congestion notification information included in each of the data packets not identified by the identifying under the situation where the congestion has occurred.

* * * * *